United States Patent [19]
Endres et al.

[11] Patent Number: 6,156,388
[45] Date of Patent: Dec. 5, 2000

[54] METHOD FOR MANUFACTURING SUBSTRATES WITH TRANSPARENT AND COLOR COATINGS STABLE AT HIGH TEMPERATURES AND IN THE PRESENCE OF ULTRAVIOLET RAYS

[75] Inventors: Klaus Endres, Homburg/Saar; Marion Lindenstruth, Saarbruecken; Martin Mennig, Quierschied; Matthias Pietsch, Giessen; Helmut Schmidt, Saarbruecken-Guedingen, all of Germany

[73] Assignee: Institut fuer neue Materialen gemeinnuetzige GmbH, Saarbruecken, Germany

[21] Appl. No.: 09/297,163

[22] PCT Filed: Oct. 30, 1997

[86] PCT No.: PCT/EP97/06006

§ 371 Date: Apr. 26, 1999

§ 102(e) Date: Apr. 26, 1999

[87] PCT Pub. No.: WO98/18736

PCT Pub. Date: May 7, 1998

[30] Foreign Application Priority Data

Oct. 31, 1996 [DE] Germany .................... 196 45 043

[51] Int. Cl.[7] ............... B05D 3/02; B05D 5/06; C03C 8/18

[52] U.S. Cl. ............... 427/376.2; 427/106; 427/165; 501/19; 501/905

[58] Field of Search ................... 427/165, 106, 427/376.2; 428/689; 501/19, 905

[56] References Cited

U.S. PATENT DOCUMENTS

| | | | |
|---|---|---|---|
| 3,723,155 | 3/1973 | Greenberg et al. | 427/165 |
| 4,359,536 | 11/1982 | Graff et al. | 501/25 |
| 4,898,842 | 2/1990 | David | 501/9 |

FOREIGN PATENT DOCUMENTS

| | | |
|---|---|---|
| 0452922 | 10/1991 | European Pat. Off. . |
| 0598472 | 5/1994 | European Pat. Off. . |
| 0739996 | 10/1996 | European Pat. Off. . |
| 4338360 | 5/1995 | Germany . |
| 9622256 | 7/1996 | WIPO . |

*Primary Examiner*—Shrive Beck
*Assistant Examiner*—Michael Barr
*Attorney, Agent, or Firm*—Heller Ehrman White & McAuliffe LLP

[57] ABSTRACT

A method of manufacturing a substrate coated with a transparent, colored coating stable to high temperature and UV includes coating the substrate with a coating composition including at least one element which is able to form a vitreous, crystalline, or partially crystalline oxide, in the form of a compound which on heat treatment yields the oxide and is present as a sol or solution in an at least predominantly aqueous medium, as the matrix-forming component, and at least one member selected from the group consisting of metal colloids, metal compound colloids, metal alloy colloids, and metal compounds which form metal colloids under reducing conditions, as the coloring component; and heat-curing the resulting coating. Particularly suitable substrates are glass substrates, such as (halogen) lamp bulbs and gas discharge tubes.

14 Claims, No Drawings

METHOD FOR MANUFACTURING SUBSTRATES WITH TRANSPARENT AND COLOR COATINGS STABLE AT HIGH TEMPERATURES AND IN THE PRESENCE OF ULTRAVIOLET RAYS

FIELD OF THE INVENTION

The present invention relates to a method of manufacturing substrates with transparent, colored coatings stable to high temperature and UV, especially (glass) substrates which during their manufacture and/or their use are exposed to high temperatures (e.g., up to 900° C.). Examples of such substrates are, in particular, bulbs for halogen and gas discharge lamps, and corresponding filters.

DESCRIPTION OF THE RELATED ART

Volume-colored glasses are manufactured by introducing colored ions of the 3d elements, by admixing chalcogenides (flash-colored glasses), or by adding noble metals (colloid-colored glasses) (see, for example, W. Vogel, Glaschemie, 3rd Edition, SpringerVerlag, 1992). Because of the inadequate chemical and thermal stability and/or the high costs of the noble metal ions, which are added to the melt in concentrations from 0.003 to 0.1% by mass, such glasses are inappropriate for the manufacture of colored mass products such as (halogen) bulbs, which are produced from silica glass or borosilicate glass.

Colored (colloid-colored) coatings on glass substrates can be obtained by introducing chromophoric metal ions, metal colloids or metal alloy colloids into an $SiO_2$ or $TiO_2$ matrix in accordance with the sol-gel technique (see, for example, DE-A-43 38 360 and S. Sakka et al., Proc. SPIE-Int. Soc. Opt. Eng. (1994), 2288 (sol-gel optics III), 108–119). The disadvantages of these described techniques lie, especially in the case of the $TiO_2$ coatings, in the use as matrix formers of alkoxides which are expensive and are unacceptable from the standpoint of health; furthermore, the drying of the coating is accompanied by the formation of large amounts of solvent vapors owing to the alcohol-based coating sols that are used.

Other options for coloring borosilicate and silica glass substrates are coatings with organic dyes, pigments or interference layers.

To color glass substrates, and especially bulbs, with organic dyes it is common to apply to said bulbs from 0.1 to 15% by weight of the dyes in, for example, an alkyd resin, polyester resin or polyurethane film. Examples of organic dyes that are used are phenoxazines, phenothiazines, triphenylmethane and anthraquinones, which are incorporated, in some cases as alkoxysilyl derivatives, into a tetraethoxysilane(TEOS)/methyltriethoxysilane(MTEOS) matrix and are applied by dip coating (see, for example, JP-A-57/182437). JP-A-04/107260 describes a technique with which yellow colors are applied by means of a pigment (quinophthalone) /$SiO_2$ coating which is applied by chemical vapor deposition (CVD). JP-A-58/156553 discloses a technique in which the coating of the inside of borosilicate glass lamps with γ-aminopropyl-triethoxysilane and a polyimide resin results in yellow or amber fog lamps. Yellow colorations, for fog lamps, are likewise achieved in accordance with JP-A-06/001635 by incorporating an organic pigment into a TEOS film, although nothing is said about the temperature stability. Pigments in an organic acrylate-urethane matrix lead, after the organic constituents have been burnt out at 780° C., to brownish yellow luster colors, which are not suited to the manufacture of yellow fog lamps (see DE-A-38 19 413). The principal disadvantages of these colorations obtained with organic dyes or pigments lie on the one hand in the complex coating techniques (inside coating, CVD) and, on the other hand, in the sometimes inadequate thermal and UV stability of the organic dyes that are used. A further disadvantage in some cases, once again, lies in the use of the abovementioned expensive alkoxides, which are commonly employed in the form of alcoholic solutions.

Interference colorations are obtained by multiple coating with $TiO_2$, $Ta_2O_5$ and $ZrO_2$ layers of high refractive index and $SiO_2$ or $SnO_2$ layers of low refractive index, which are provided alternatingly atop one another (see, for example, JP-A-07/078601 and JP-A-02/250201). Layer application can take place by sputtering, dipping, CVD, or hot spraying techniques. To date, it is predominantly yellow lamps which have been manufactured using interference layers. A disadvantage of this technique is that multiple coatings with up to eight coating operations are required in order to achieve the desired colorations, for yellow layers, for example. Furthermore, alkoxides are used here as well in the case of the wet-coating techniques.

SUMMARY OF THE INVENTION

In contradistinction to the techniques described above a method has been found, in accordance with the invention, of manufacturing transparent, colored coatings stable to high temperature and UV on substrates, especially glass substrates (e.g., bulbs and gas discharge tubes), which offers the advantage that to produce the colored layers the matrix is formed not by hydrolysis of a metal compound having hydrolytically eliminable alkoxy groups in an organic (generally alcoholic) solvent, with subsequent polycondensation, but by heat treatment of aqueous solutions or sols of matrix-forming element compounds. Furthermore, in contradistinction to the abovementioned coating techniques, it is possible in this method to produce different colorations in only one single coating step.

The invention accordingly provides a method of manufacturing substrates, especially glass substrates, with transparent, colored coatings stable to high temperature and UV, which comprises furnishing a substrate with a coating composition comprising (A) at least one element which is able to form a vitreous, crystalline or partially crystalline oxide, in the form of a compound which on heat treatment is able to yield said oxide and is present as a sol or solution in an at least predominantly aqueous medium, as the matrix-forming component; and (B) at least one member from the group consisting of metal colloids, metal compound colloids and metal alloy colloids and metal compounds which are able under reducing conditions to form metal colloids, as the coloring component; and heat-curing (densifying) the resulting coating, accompanied by formation of the coated substrate.

DETAILED DESCRIPTION OF THE INVENTION

In the method of the invention the formation of color takes place by means of metal (compound) colloids or metal alloy colloids in a suitable matrix. Colloid formation may take place in solution or during the densification of the layers with the aid of reducing agents that are required for colloid formation in the case of metal compounds to be reduced (which reducing agents may at the same time function as complex ligands for the metal compounds that are employed) and/or by means of an appropriate reaction regime. Through an appropriate choice of the complexing agents, if used, and through the reaction regime it is possible to control the processes of nucleation and growth of the colloids in solution and during heat curing (densification) of the coatings.

Suitable matrix materials are vitreous (e.g., borosilicate, alumosilicate, $SiO_2$, lead silicate), partially crystalline, or crystalline (e.g., $TiO_2$, $ZrO_2$, ZnO) materials (oxides). Said matrix can be produced using individual particulate sol systems, such as $SiO_2$, $TiO_2$, $ZrO_2$ or $Al_2O_3$ sols, or else using mixtures of such sol systems. Suitable matrix-forming elements include both those whose oxides are typical glass formers, such as Si, B, Al, Pb, Ge, Bi, Sb, As, and P, and those which preferentially form crystalline or partially crystalline oxides, such as Ti, Zr, Hf, V, Nb, Ta, W, Mo, Al, Zn, Sn, and Ce. Preferred colloidal metal oxides are oxides of elements of subgroups 4 to 6, especially Ti, Zr, Nb, and Ta, and also oxides of Al, B, Sn, Zn, and Ce. It is also possible to modify the matrix by adding salts such as those, for example, of Pb, Ce, Zn and alkali metals and alkaline earth metals (especially Na, K, Mg and Ca), such as the acetates, nitrates or hydroxides of these metals. Thus it is possible, for example, to vary the refractive index of a silicatic matrix, by incorporating PbO, in such a way that it can be matched to the refractive index of the substrate. In addition, the variation of the refractive index of the matrix results in a shift in the absorption bands of the metal colloids and thus in a shift in the color locus. In the case of matrices of high refractive index (e.g., $TiO_2$, $ZrO_2$) the refractive index and thus the color locus can be varied in particular by means of controlled incorporation of alkali metal ions.

Examples of the components (A) of the coating composition are reactive silica sols, silicate solutions, particulate systems of the oxides of Ti, Zr, Nb, Ta, Al, Ce, and Sn, and also (aqueous) solutions of metal salts, examples being salts of Pb, Zn, and Bi (and of the alkali metals and alkaline earth metals) Examples of suitable salts are the formates, acetates, tartrates, citrates, carbonates, halides, nitrates, and hydroxides. As, Sb, P and B can also be employed in the form of water-soluble arsenates, antimonates, phosphates, and borates, respectively.

Particularly suitable as the coloring component (B) of the coating composition employed in accordance with the invention are colloids of Au, Ag, Cu, Pt, Ir, Rh, Pd, Ru and mixtures thereof and also corresponding metal compound colloids and metal alloy colloids. Particularly preferred metals are Au, Ag and Cu. These colloids generally have a particle diameter of from 1 to 50 nm, in particular from 5 to 20 µm. When using metal compounds which form metal colloids under reducing conditions, they are generally employed in complexed form, it being possible to use, for example, the complexing agents described below. The amount of coloring component employed is dependent on the desired color intensity of the coatings. Normally, the metals of component (B) are present in the concentration of from 0.01 to 50 atom %, based on the sum of the element atoms of component (A) and of the metal atoms of component (B).

Examples of suitable complexing agents are halide ions (especially chloride ions) and the corresponding hydrohalic acids, monoamines, di-, tri-, tetra- and higher polyamines (for example, 3-amino-propyltriethoxysilane (APTS), N-(2-aminoethyl)-3-amino-propyltrimethoxysilane (DIAMO), triethylenetetramine, diethylenetriamine and ethylenediamine), thio compounds, thiocyano compounds, sugars (e.g., pentoses and hexoses such as glucose, for example), β-dicarbonyl compounds such as, for example, diketones (e.g., acetylacetone) and keto esters (e.g., allyl acetoacetate and ethyl acetoacetate), ether alcohols, polyols (including polymeric polyols such as polyalkylene glycols), crown ethers, and phosphorus compounds. These complexing agents may also be employed, at least in part, as reducing agents for the metal compound. When a complexing agent is used the ratio of metal atoms to the complexing groups that are present is preferably from 1:0.1 to 1:500, in particular from 1:1 to 1:200.

Further optional components of the coating composition employed in accordance with the invention are, in particular, acids and bases (examples being formic acid, acetic acid, hydrochloric acid and nitric acid, ammonia) which are used, if appropriate, in particular for stabilizing the starting materials employed for the matrix-forming component, and organic or inorganic binders, such as alkylhydroxycelluloses, polyvinyl alcohol, polyvinylpyrrolidone, polyethylene glycols, and alkali metal silicate solutions. Further optional additions are highly volatile organic solvents, such as ethers or alcohols, in small amounts (for example up to 10% by volume, based on water plus organic solvent). In very general terms, the abovementioned expression "predominantly aqueous medium" means that the medium includes at least 70, preferably at least 80 and, in particular, at least 90% by volume of water. Particular preference is given to a medium which consists exclusively, or almost exclusively, of water.

As already mentioned above, the substrates for the process of the invention are preferably glass substrates. However, it is also possible to subject substrates of other materials, examples being metal and ceramics, to coating in accordance with the invention. Especially in the case of substrate materials other than glass, pretreatment of the material to improve the adhesion of the coating to it may be of advantage.

After the desired viscosity has, if desired, been established by adding or removing solvent (water), the coating solution, or a mixture of two coating solutions with different chromophoric components (and possibly with different matrix-forming components too) can be applied to the substrate, such as a bulb, by the customary (wet) coating techniques (e.g., spraying, dipping, brushing). To adapt the wetting properties of the coating material to the substrate it is possible if desired to add the abovementioned organic or inorganic binders and/or highly volatile organic additions in small amounts. Examples of materials for glass substrates are borosilicate glass and silica glass. These substrates may have a very wide variety of geometries, although the method of the invention is particularly suitable for coating (halogen) bulbs and gas discharge lamps.

Once coating has taken place, the substrates are generally dried at room temperature or elevated temperature (for example, at up to 100° C.). This is followed by heat curing (densification) of the applied coatings at temperatures which usually extend from 450° C. up to a short way below the softening point of the substrate material (in the case of glass, generally up to 900° C.). Densification can take place, for example, in a furnace (tunnel furnace), with a burner flame, by means of IR radiation or similar suitable heat supply techniques.

The coating composition used in accordance with the invention can be densified thermally to give crackfree, transparent, homogeneous coatings. In the case of compounds as component (B) which can be reduced to metal colloids, for example, the chromophoric components introduced can be reduced by means of reducing agents that are incorporated into the coating composition (or else, for example, by means of a reducing gas atmosphere during the heat treatment), retain their function (light absorption), and give rise to intensely colored layers. High-temperature densification (for example, at from 450 to 900° C.) permits the manufacture of coatings possessing high luster and high thermal, mechanical, chemical and UV stability on substrates. Furthermore, the colorations thereof are independent of the composition of the substrate (e.g., borosilicate, silica glass, etc.).

The examples which follow illustrate the invention.

EXAMPLE 1

Producing a blue lamp coating (I)

1.024 g of gold(III) chloride ($AuCl_3 \times 3\ H_2O$) are dissolved in 20 g of a colloidal $TiO_2$ solution (TA-10, Nissan Chemical Industries, Limited) containing 10% by weight of $TiO_2$ in $HNO_3$-acidic aqueous solution. After stirring for 15 minutes, the sol is ready for coating. In a dip coating procedure, substrates (bulbs) are drawn from the coating sol at a rate of 2 mm/s. The densification of the layers takes place at 900° C. for 60 minutes. The heating rate is 60–100 K/h. The resulting layers have an intense blue coloration.

Producing a blue lamp coating (II)

1.278 g of tetrachloroauric acid ($HAuCl_4 \times 3\ H_2O$) are dissolved in 20 g of a colloidal $ZrO_2$ Solution ($ZrO_2$-Ac, The PQ-Corporation, Nyacol Products Inc.) containing 20% by weight of $ZrO_2$ in acetic acidic aqueous solution. After stirring for 15 minutes, the sol is ready for coating. In a dip coating procedure, the substrates are drawn from the coating sol at a rate of 2 mm/s. The densification of the layers takes place at 900° C. for 60 minutes. The heating rate is 60–100 K/h. The resulting layers have an intense blue coloration.

EXAMPLE 2

Producing a reddish violet lamp coating 0.442 g of silver nitrate ($AgNO_3$) are dissolved in 20 g of a colloidal $TiO_2$ solution (TA-10, Nissan Chemical Industries, Limited) containing 10% by weight of $TiO_2$ in $HNO_3$-acidic aqueous solution. After stirring for 15 minutes, the sol is ready for coating. In a dip coating procedure, substrates are drawn from the coating sol at a rate of 2 mm/s. The densification of the layers takes place at 600° C. for 60 minutes under forming gas (92% by volume $N_2$, 8% by volume $H_2$) The heating rate is 60–100 K/h. The resulting layers have an intense reddish violet coloration.

EXAMPLE 3

Producing a yellow lamp coating 0.442 g of silver nitrate are dissolved in 20 g of a colloidal $TiO_2$ solution (TA-10, Nissan Chemical Industries, Limited) containing 10% by weight of $TiO_2$ in $HN0_3$-acidic aqueous solution. After stirring for 15 minutes, the sol is ready for coating. In a dip coating procedure, the substrates are drawn from the coating sol at a rate of 2 mm/s. The densification of the layers takes place at 600° C. for 60 minutes under air. The heating rate is 60–100 K/h. The resulting layers have a yellow coloration.

EXAMPLE 4

Producing a green lamp coating 0.628 g of copper nitrate ($Cu(NO_3)_2 \times 3\ H_2O$) and 0.468 g of glucose are dissolved in succession in 20 g of a colloidal $TiO_2$ solution (TA-10, Nissan Chemical Industries, Limited) containing 10% by weight of $TiO_2$ in $HNO_3$-acidic aqueous solution. After stirring for 15 minutes at 50° C. and subsequent cooling to room temperature, the sol is ready for coating. In a dip coating procedure, the substrates are drawn from the coating sol at a rate of 2 mm/s. The densification of the layers takes place at 600° C. for 60 minutes under forming gas. The heating rate is 60–100 K/h. The resulting layers have an intense green coloration.

EXAMPLE 5

Producing a red lamp coating 2.4 g of N-(2-aminoethyl-3-aminopropyl) trimethoxysilane and 2 g of lead(II) acetate ($Pb(CH_3COO)_2$) are dissolved in succession in 12 g of a colloidal $SiO_2$ solution (VP-AC 4038, Bayer) containing 30% by weight Of $SiO_2$ in ammonia alkali aqueous solution. To this solution there is added a solution of 1.4 g of gold(III) chloride in 3 ml of water to which, additionally, 1 ml of diethylenetriamine has been added. After stirring for 15 minutes the sol is ready for coating. In a dip coating procedure, the substrates are drawn from the coating sol at a rate of 1 mm/s. The densification of the layers takes place at 600° C. for 60 minutes. The heating rate is 60–100 K/h. The resulting layers have an intense red coloration.

We claim:

1. A method of manufacturing a substrate coated with a transparent, colored coating, the method comprising:
   (1) coating the substrate with a coating composition comprising:
      (A) at least one element which is able to form a vitreous, crystalline, or partially crystalline oxide, in the form of a compound which on heat treatment yields the oxide and is present as a sol or solution in an at least predominantly aqueous medium, as the matrix-forming component; and
      (B) at least one member selected from the group consisting of metal colloids, metal compound colloids, metal alloy colloids, and metal compounds which form metal colloids under reducing conditions, as the coloring component, and
   (2) heat-curing the resulting coating at a temperature sufficient to cause formation of the oxide of the at least one element which is able to form a vitreous, crystalline, or partially crystalline oxide, thereby manufacturing the coated substrate.

2. The method of claim 1, wherein the element of component (A) is selected from the group consisting of Si, B, Al, Pb, Ge, Bi, Sb, As, P, Ti, Zr, Hf, V, Mo, W, Nb, Ta, Zn, Sn, Ce, and mixtures thereof.

3. The method of claim 2, wherein the element of component (A) comprises at least one of Si, Ti, and Zr.

4. The method of claim 1, wherein component (A) additionally comprises at least one compound of a matrix-modifying element.

5. The method of claim 4, wherein the matrix-modifying element is selected from the group consisting of alkali metals and alkaline earth metals.

6. The method of claim 1, wherein the at least predominantly aqueous medium of component (A) comprises at least 70% by volume of water.

7. The method of claim 1, wherein the metal of the at least one member of component (B) is selected from the group consisting of Au, Ag, Cu, Pd, Pt, Ir, Rh, Ru, and mixtures thereof.

8. The method of claim 1, wherein the metal of the at least one member of component (B) is present in a concentration of from 0.01 to 50 atom %, based on the sum of the atoms of the element of component (A) and the atoms of the metal present in the at least one member of component (B).

9. The method of claim 1, wherein the metal compounds of component (B) are present, at least in part, in complexed form.

10. The method of claim 9, wherein the ratio of metal atoms to complexing groups is from 10:1 to 1:500.

11. The method of claim 1, wherein the coating composition additionally comprises at least one member selected from the group consisting of acids, bases, reducing agents for the metal compound of component (B), and inorganic binders, organic binders, and organic solvents.

12. The method of claim 1, wherein the substrate is a glass substrate.

13. The method of claim 12, wherein the glass substrate is selected from the group consisting of lamp bulbs, halogen lamp tubes, gas discharge tubes, and filters.

14. A coating composition for manufacturing a transparent, colored coating stable to high temperatures and UV, comprising:

(A) at least one element which is able to form a vitreous, crystalline, or partially crystalline oxide, in the form of a compound which on heat treatment yields the oxide and is present as a sol or solution in an at least predominantly aqueous medium, as the matrix-forming component; and (B) at least one member selected from the group consisting of metal colloids, metal compound colloids, metal alloy colloids, and metal compounds which form metal colloids under reducing conditions, as the coloring component.

* * * * *